US 9,568,088 B2

(12) United States Patent
DiMatteo et al.

(10) Patent No.: US 9,568,088 B2
(45) Date of Patent: Feb. 14, 2017

(54) PLUG FOR A PLANETARY PIN ASSEMBLY

(71) Applicant: Koyo Bearings North America LLC, Westlake, OH (US)

(72) Inventors: Giovanni DiMatteo, Fenton, MI (US); Marc T. Dickison, Plymouth, MI (US)

(73) Assignee: Koyo Bearings North America LLC, Westlake, OH (US)

( * ) Notice: Subject to any disclaimer, the term of this patent is extended or adjusted under 35 U.S.C. 154(b) by 278 days.

(21) Appl. No.: 14/395,202

(22) PCT Filed: May 1, 2013

(86) PCT No.: PCT/US2013/039066
§ 371 (c)(1),
(2) Date: Oct. 17, 2014

(87) PCT Pub. No.: WO2013/166149
PCT Pub. Date: Nov. 7, 2013

(65) Prior Publication Data
US 2015/0072825 A1 Mar. 12, 2015

Related U.S. Application Data

(60) Provisional application No. 61/641,620, filed on May 2, 2012.

(51) Int. Cl.
*F16H 57/04* (2010.01)
(52) U.S. Cl.
CPC ...... *F16H 57/0409* (2013.01); *F16H 57/0471* (2013.01); *F16H 57/0479* (2013.01)
(58) Field of Classification Search
None
See application file for complete search history.

(56) References Cited

U.S. PATENT DOCUMENTS

| 3,272,948 | A | * | 9/1966 | Gloviak | ............... | B60R 16/005 |
| | | | | | | 200/290 |
| 2003/0181285 | A1 | * | 9/2003 | Tanikawa | .............. | F16H 57/082 |
| | | | | | | 475/346 |
| 2011/0251010 | A1 | * | 10/2011 | Grimm | ................. | F16C 17/047 |
| | | | | | | 475/159 |

FOREIGN PATENT DOCUMENTS

| JP | 53820793 U | 10/1963 |
| JP | 2004108451 A | 4/2004 |
| JP | 2006214580 A | 8/2006 |
| JP | 2007170566 A | 7/2007 |

(Continued)

OTHER PUBLICATIONS

International Search Report and Written Opinion for PCT/US2013/039066 dated Aug. 1, 2013.

(Continued)

*Primary Examiner* — Edwin A Young
(74) *Attorney, Agent, or Firm* — Nelson Mullins Riley & Scarborough, LLP

(57) ABSTRACT

A pin assembly for use in a planetary gear, including a pin defining a blind bore therein, the blind bore extending axially from an opening and terminating with an end face, and an annular rib depending inwardly from an inner surface of the blind bore adjacent the opening. A plug includes a stopper portion and a shaft extending therefrom, the stopper portion including a circular base defining an outer perimeter. The outer perimeter of the stopper portion engages the annular rib, thereby maintaining the plug in the blind bore.

20 Claims, 2 Drawing Sheets

(56) References Cited

FOREIGN PATENT DOCUMENTS

| JP | 2008128286 A | 6/2008 |
|---|---|---|
| JP | 2009192072 A | 8/2009 |
| JP | 2010242790 A | 10/2010 |

OTHER PUBLICATIONS

Office Action dated Dec. 1, 2015 for Japanese Patent Application No. 2015-510428.
Office Action dated Jan. 8, 2016 for Korean Patent Application No. 10-2014-7030543.

\* cited by examiner

PLUG FOR A PLANETARY PIN ASSEMBLY

FIELD OF THE INVENTION

The present disclosure relates generally to planetary bearings. More particularly, the present disclosure is related to a plug for enhancing lubrication flow through a pin of a planetary bearing.

BACKGROUND

A typical concern with planetary bearings in transmissions is sufficient lubrication flow to the rolling elements of the planetary bearing. Lube dams on carriers, hollow pins, semi-hollow pins, cross drilled pins, ball/drawn plug pins, etc., are devices and methods that direct lubrication to the planetary bearing. Each of these designs has its own concerns, which can include high cost, additional customer assembly, pin deformation from pressed ball or drawn steel plug, risk of pressed plugs falling out, and debris/burrs from multiple complex machining operations that require special considerations (i.e., deburring and washing operations).

The present invention recognizes and addresses considerations of prior art constructions and methods.

SUMMARY

One embodiment in accordance with the present disclosure is a pin assembly for use in a planetary gear, including a pin defining a blind bore therein, the blind bore extending axially from an opening and terminating with an end face, and an annular rib depending inwardly from an inner surface of the blind bore adjacent the opening A plug includes a stopper portion and a shaft extending therefrom, the stopper portion including a circular base defining an outer perimeter. The outer perimeter of the stopper portion engages the annular rib, thereby maintaining the plug in the blind bore.

Another embodiment in accordance with the present disclosure is a pin assembly for use in a planetary gear, including a pin defining a blind bore therein, the blind bore extending axially from an opening and terminating with an end face, and an annular rib depending inwardly from an inner surface of the blind bore adjacent the opening. A plug includes a stopper portion, the stopper portion including a circular base defining an outer perimeter. The outer perimeter of the stopper portion engages the annular rib, thereby maintaining the plug in the blind bore.

Yet another embodiment in accordance with the present disclosure is a pin assembly for use in a planetary gear, including a pin defining a blind bore therein, the blind bore extending axially from an opening and terminating with an end face, and an annular rib depending inwardly from an inner surface of the blind bore adjacent the opening A plug includes a stopper portion and a shaft extending therefrom to a distal end, the stopper portion including a circular base defining an outer perimeter. The distal end of the shaft abuts the end face of the blind bore when the plug is inserted in the blind bore.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
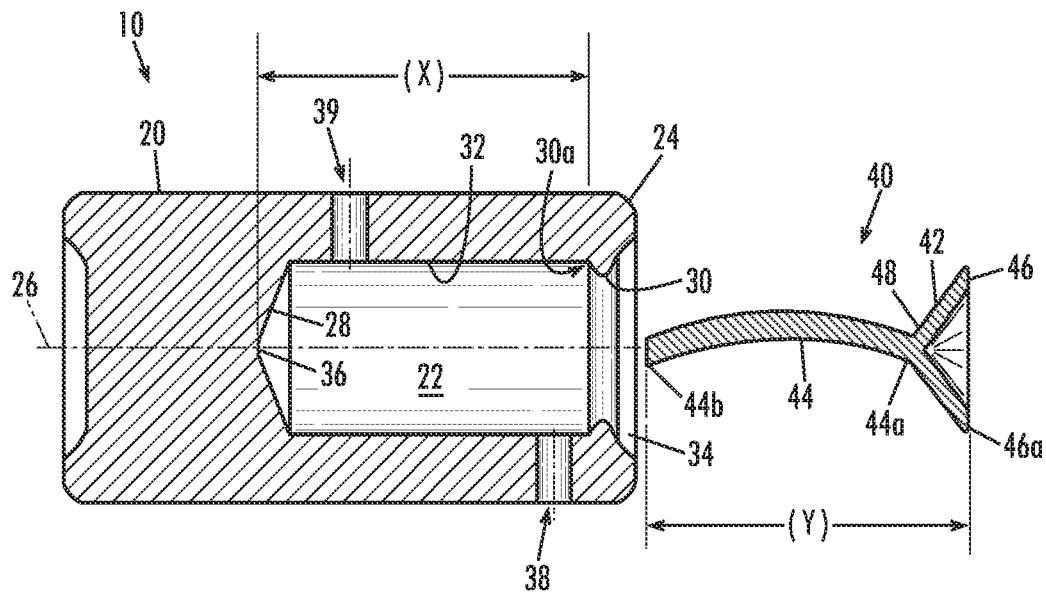
FIG. 1 is a cross-sectional view of a planetary bearing pin and plug assembly in accordance with an embodiment of the present disclosure.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
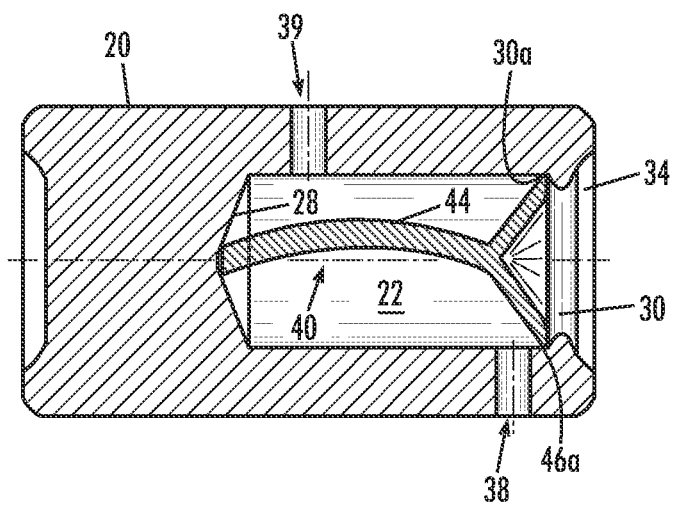
FIG. 2 is a cross-sectional view of the planetary bearing pin and plug assembly, as shown in FIG. 1, in an assembled state.

Referring now to the figures, a planetary pin assembly 10 in accordance with the present disclosure is shown in FIGS. 1 and 2. Planetary pin assembly 10 includes a planetary pin 20 defining a blind bore 22 and a plug 40 including a stopper portion 42 and shaft 44 extending therefrom. As shown, plug 40 is slidably received in blind bore 22 of planetary pin 20.

As shown in FIG. 1, blind bore 22 extends inwardly from a first end 24 of planetary pin 20 such that blind bore 22 is concentric about a longitudinal center axis 26 of planetary pin 20. Blind bore 22 terminates at a conically-shaped end face 28. Note, however, in alternate embodiments, end face 28 may be planar. An annular rib 30 extends inwardly from an inner surface 32 of blind bore 22. Annular rib 30 is disposed adjacent an opening 34 of blind bore 22 at first end 24 of planetary pin 20. Preferably, an apex 36 of end face 28 and the innermost portion 30a of annular rib 30 are separated by a distance (X). An inlet bore 38 and an outlet bore 39 extend radially inwardly from an outer cylindrical surface of planetary pin 20 to inner cylindrical surface of blind bore 22.

Plug 40 includes a stopper portion 42 and shaft 44 extending therefrom. As shown, stopper portion 42 is preferably a hollow cone structure with an outer wall which extends from a cylindrical base 46 to an apex 48. Shaft 44 extends outwardly from apex 48 of stopper portion. As shown, shaft 44 is slightly bowed between its proximal end 44a and distal end 44b, for reasons discussed below. Note, however, in alternate embodiments, shaft 44 need not include bowing when in the "at rest" state. Additionally, in alternate embodiments, stopper portion 42 can be a solid cone structure, or have a different configuration altogether, such as a cylindrical disk. In the preferred embodiment shown, an overall length of plug 40 from distal end 44b of shaft 44 to base 46 of stopper 42 is a distance (Y). Plug 40 is preferably constructed of a flexible polymer, but other materials may be used, such as steel.

Referring again to FIG. 2, plug 40 is inserted into blind bore 22 until distal end 44b of shaft 44 abuts end face 28. Inward pressure on plug 40 continues until an outer perimeter 46a of cylindrical base 46 engages innermost portion 30a of annular rib 30. Preferably, distance (X) between end face 28 and annular rib 30 is slightly less than the overall length (Y) of plug 40. As such, further bowing of shaft 44 occurs when plug 40 is fully received in blind bore 22. The bowing of shaft 44 assists in seating outer perimeter 46a of stopper portion 42 against annular rib 30, thereby encouraging inward lubrication flow through inlet bore 38 to pass out of blind bore 22 through outlet bore 39, rather than exiting through opening 34.

Figure 3:
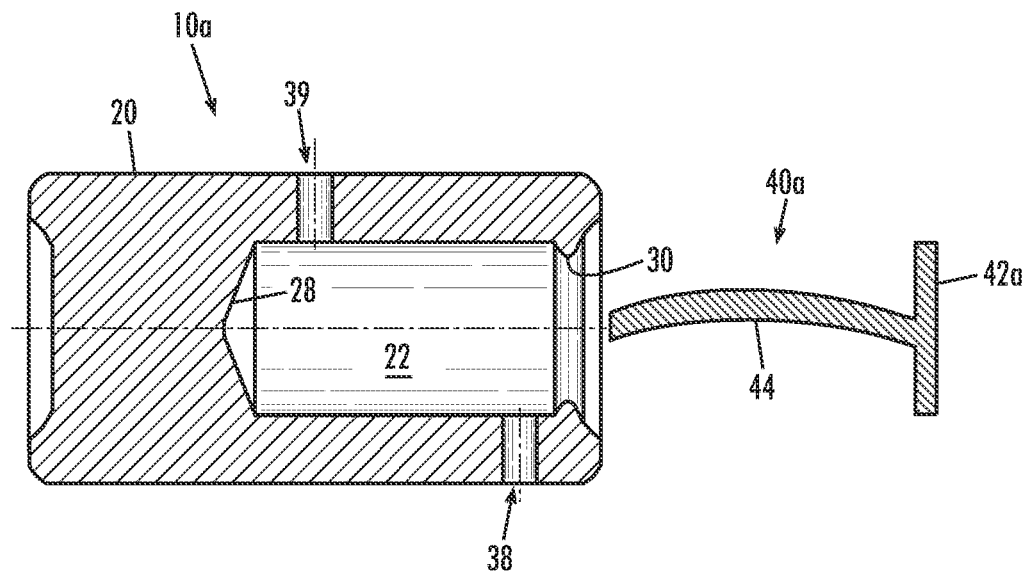
FIG. 3 is a cross-sectional view of a planetary bearing pin and plug assembly in accordance with an alternate embodiment of the present disclosure.
Figure 4:
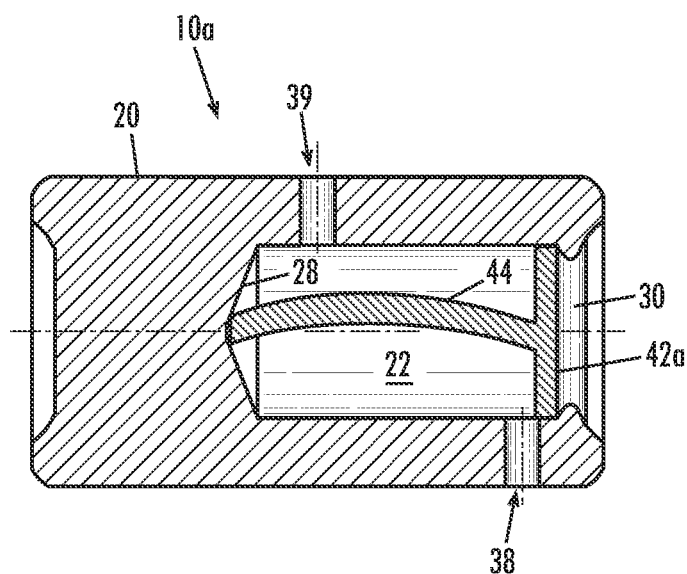
FIG. 4 is a cross-sectional view of the planetary bearing pin and plug assembly, as shown in FIG. 3, in an assembled state.

Referring now to FIGS. 3 and 4, an alternate embodiment of a planetary pin assembly 10a is shown. Planetary pin assembly 10a differs from the embodiment previously discussed with regard to FIGS. 1 and 2 in that stopper portion 42a of plug 40a is a cylindrical disk rather than a hollow cone. All other aspects are the same and, as such, further discussion of this embodiment is omitted here.

While one or more preferred embodiments of the invention are described above, it should be appreciated by those skilled in the art that various modifications and variations can be made in the present invention without departing from the scope and spirit thereof. For example, alternate embodiments of plugs can include stopper portions that differ in thickness and shape from each other, are constructed of various elastically deformable materials, etc. It is intended that the present invention cover such modifications and variations as come within the scope and spirit of the appended claims and their equivalents.

What is claimed:

1. A pin assembly for use in a planetary gear, comprising:
a pin defining a blind bore therein, the blind bore extending axially from an opening and terminating with an end face, and an annular rib depending inwardly from an inner surface of the blind bore adjacent the opening; and
a plug including a stopper portion and a shaft extending therefrom, the stopper portion including a circular base defining an outer perimeter,
wherein the outer perimeter of the stopper portion engages the annular rib, thereby maintaining the plug in the blind bore.

2. The pin assembly of claim 1, wherein the stopper portion further comprises a cone with an outer wall extending from the circular base to an apex.

3. The pin assembly of claim 2, wherein the cone is hollow.

4. The pin assembly of claim 2, wherein the shaft extends outwardly from the apex of the cone.

5. The pin assembly of claim 1, wherein the plug is constructed of a flexible polymer.

6. The pin assembly of claim 1, wherein the stopper portion of the plug is a cylindrical disk.

7. The pin assembly of claim 1, wherein a first distance from the annular rib to the end face of the blind bore is less than a second distance from a distal end of the shaft to the circular base of the stopper.

8. The pin assembly of claim 1, further comprising an inlet bore and a outlet bore, both the inlet bore and the outlet bore extending radially inwardly from an outer cylindrical surface of the pin to the inner surface of the blind bore.

9. The pin assembly of claim 1, wherein the shaft of the plug is bowed prior to insertion into the blind bore.

10. A pin assembly for use in a planetary gear, comprising:
a pin defining a blind bore therein, the blind bore extending axially from an opening and terminating with an end face, and an annular rib depending inwardly from an inner surface of the blind bore adjacent the opening; and
a plug including a stopper portion, the stopper portion including a circular base defining an outer perimeter,
wherein the outer perimeter of the stopper portion engages the annular rib, thereby maintaining the plug in the blind bore.

11. The pin assembly of claim 10, wherein the plug further comprises a shaft portion extending therefrom.

12. The pin assembly of claim 11, wherein a first distance from the annular rib to the end face of the blind bore is less than a second distance from a distal end of the shaft to the circular base of the stopper.

13. The pin assembly of claim 10, wherein the stopper portion further comprises a cone with an outer wall extending from the circular base to an apex.

14. The pin assembly of claim 10, wherein the plug is constructed of a flexible polymer.

15. The pin assembly of claim 10, wherein the stopper portion of the plug is a cylindrical disk.

16. The pin assembly of claim 10, further comprising an inlet bore and a outlet bore, both the inlet bore and the outlet bore extending radially inwardly from an outer cylindrical surface of the pin to the inner surface of the blind bore.

17. A pin assembly for use in a planetary gear, comprising:
a pin defining a blind bore therein, the blind bore extending axially from an opening and terminating with an end face, and an annular rib depending inwardly from an inner surface of the blind bore adjacent the opening; and
a plug including a stopper portion and a shaft extending therefrom to a distal end, the stopper portion including a circular base defining an outer perimeter,
wherein the distal end of the shaft abuts the end face of the blind bore when the plug is inserted in the blind bore.

18. The pin assembly of claim 17, wherein the outer perimeter of the stopper portion engages the annular rib, thereby maintaining the plug in the blind bore.

19. The pin assembly of claim 17, wherein the stopper portion further comprises a cone with an outer wall extending from the circular base to an apex.

20. The pin assembly of claim 17, wherein the stopper portion of the plug is a cylindrical disk.

* * * * *